United States Patent [19]

Spruiell et al.

[11] Patent Number: 4,670,139

[45] Date of Patent: Jun. 2, 1987

[54] DRILLING MUD CLEANING MACHINE

[76] Inventors: Walter L. Spruiell, P.O. Box 547; Jerry L. Spruiell, 302 E. Lafayette, both of Iowa Park, Tex. 76367

[21] Appl. No.: 876,117

[22] Filed: Jun. 19, 1986

[51] Int. Cl.[4] .............................................. B01D 21/26

[52] U.S. Cl. .................................... 210/167; 210/188; 210/195.3; 210/253; 210/260; 210/512.2; 210/787; 209/211

[58] Field of Search .................. 210/512.1, 512.2, 787, 210/788, 251, 260, 294, 167, 188, 195.3, 197, 253; 209/211, 209, 144

[56] References Cited

U.S. PATENT DOCUMENTS

| | | | |
|---|---|---|---|
| 2,886,287 | 5/1959 | Croley | 209/211 |
| 2,919,898 | 8/1957 | Marwil et al. | 209/211 |
| 2,923,151 | 2/1960 | Engle et al. | 209/211 |
| 3,237,777 | 6/1962 | Brown et al. | 210/512.2 |
| 3,303,895 | 2/1967 | Fontenot | 210/512.2 |
| 4,571,296 | 2/1986 | Lott | 210/512.1 |

*Primary Examiner*—Benoit Castel
*Assistant Examiner*—Richard D. Jordan
*Attorney, Agent, or Firm*—Stephen D. Carver

[57] ABSTRACT

A machine for cleaning drilling muds by removing entrained solids and impurities and returning cleansed and for recycling. The machine comprises a centrifuge desander operatively connected to a plurality of cooperating conical desilters to remove gases and separate materials of varying densities. Initially muds containing solid materials are pumped at a controlled pressure from the cleaning bed into an initial cyclone chamber, where, under increasing centrifugal force, the processed mud is separated into relatively heavier and lighter components, which are transmitted via separate pathways to twin chambers in the lower level compartment of a particle separating drum. The first chamber of the drum receives heavier materials and transmits them to a large desander cone where the heaviest impurities are removed; the second drum chamber receives the lighter components which are further separated and delivered to a network of desilter cones which output properly cleansed mud. The purified output of the large densander cone is transmitted directly back into the cleaning bed reservoir, and "dirty" mud is thus recycled continuously until "clean enough" to escape the loop by exiting through the desilter cones. Freed air and gasses are discharged at controlled rates to be burned or dispersed into the environment through a third stage, which is in fluid flow communication with the initial stage and the desilter stage. Through the gas removal construction disclosed, the efficiency of the various stages of the cleaning processes is increased, and drilling mud losses are minimized.

4 Claims, 9 Drawing Figures

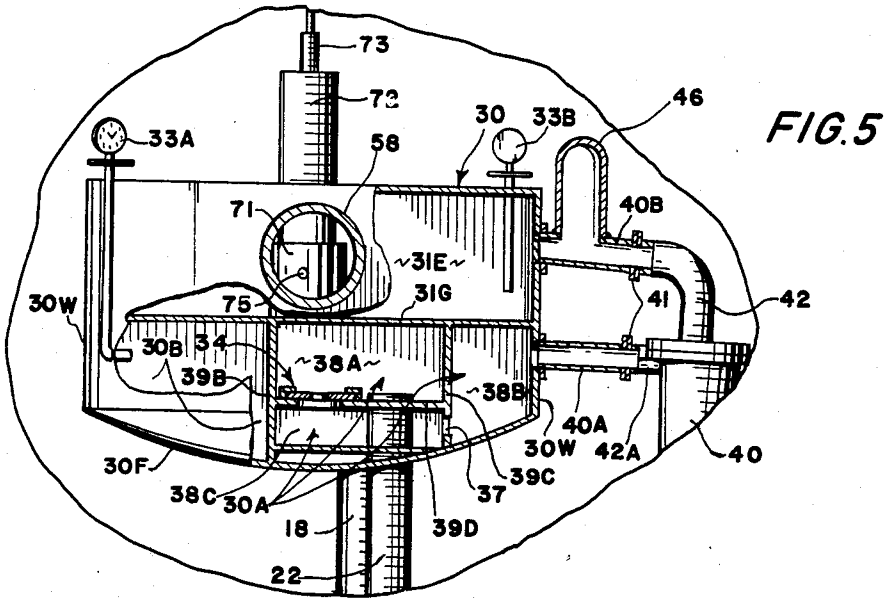
FIG. 5
FIG. 6
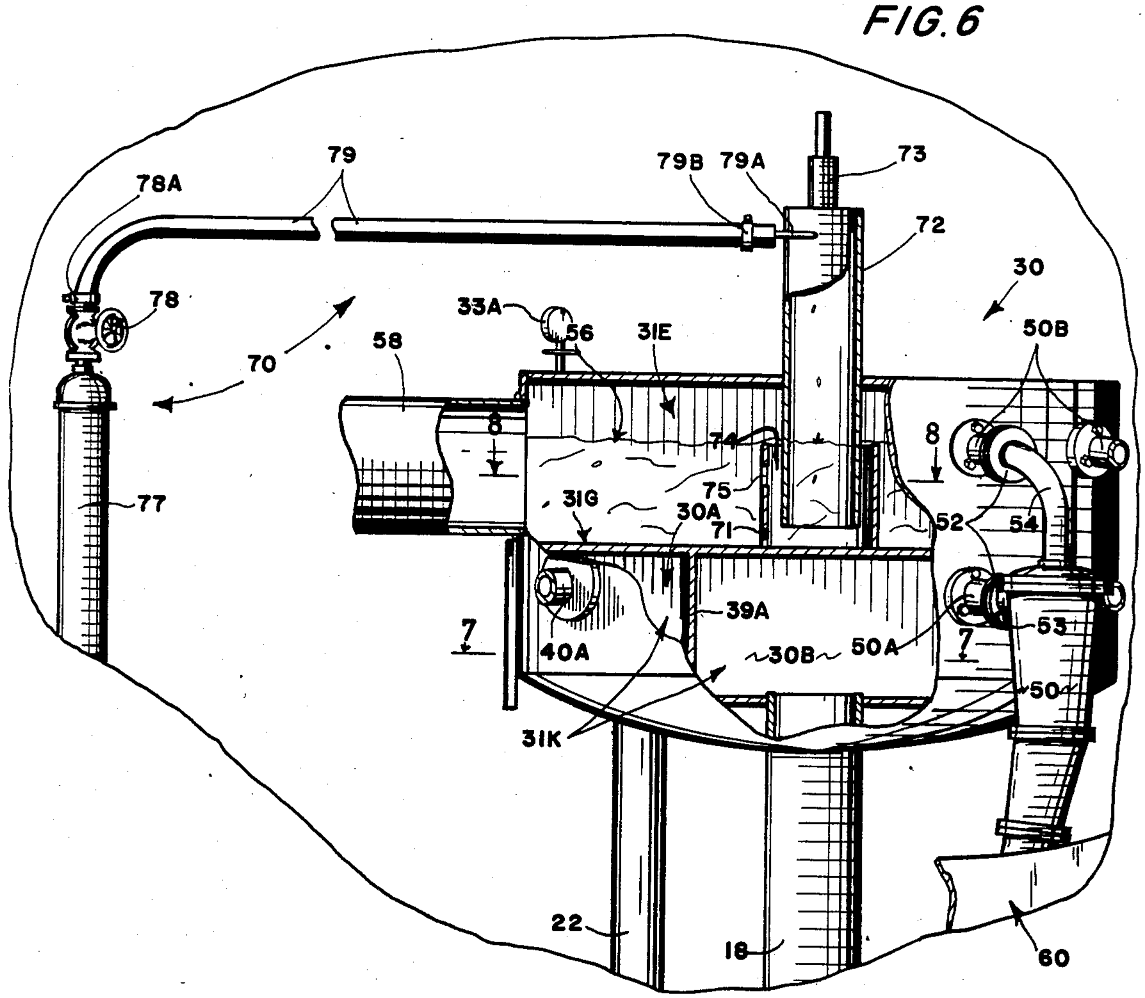

DRILLING MUD CLEANING MACHINE

BACKGROUND OF THE INVENTION

This invention relates generally to recirculating systems for cleaning drilling muds. More particularly, the present invention relates to a desander/desilter mud cleaning system which combines the controlled multi stage use of centrifugal force and pressure for separating media of varying particle density.

As will be appreciated by those skilled in the industry, drilling muds are generally employed in the rotary drilling process as a medium for carrying solid cuttings such as sand, shale, and heavier rock particles recovered from the depths of the well to the upper surface of the earth. Because great volumes of mud are required for drilling and because the muds are generally quite expensive, it has become the common practice of those in the drilling industry to clean and reuse the drilling muds in order to maximize their economic benefit. The initial step in preparing the drilling muds for reuse involves the removal of the heavier materials recovered in drilling and the separation of the media of various density from the drilling mud. The present invention addresses itself principally to this initial stage of the cleaning process.

A number of prior art cleaning devices known to us demonstrate the employment of centrifugal force or a "cyclone" to create an interior vacuum which draws the lighter, more fluid drilling mud to the upper chambers of a suitable reservoir, leaving the heavier particles deposited at various levels therebelow. Mud-cleaning systems of this type are generally described in U.S. Pat. Nos. 2,274,503; 2,098,608; 4,216,095; and, 4,447,322.

U.S. Pat. Nos. 3,213,879 and 3,243,043 describe methods and mechanisms for regulating the discharge of solids from centrifuge separators. U.S. Pat. No. 4,462,899 describes a multiple chamber hydrocyclone cleaner assembly.

A more complex separator device which is adapted to separate gases and fine particles from the coarser materials recovered in deep rotary drilling is described by Freeman, U.S. Pat. No. 2,757,582. The Freeman device depends upon the downward, gravitational pull on the liquid medium as it passes through a vertical cone. A similarly vertically disposed cyclone separator is described in U.S. Pat. No. 2,756,878, which provides an additional outflow for separating out products of varying intermediate densities. Other relevant prior art devices known to us are presented in U.S. Pat. Nos. 2,723,750; 2,717,695; and 2,379,411, as well as my own separator invention defined in U.S. Pat. No. 4,431,535.

None of the prior art devices known to us, however, satisfactorily addresses problems commonly encountered in the desanding and desilting process. For example, "dirty" drilling mud returned to the surface may be constantly varying in the percentage, quality and content of contamination. The mud may contain at a given time a variety of recovered particles, liquid products, and gaseous materials of a wide range of density. The mud at one instant may be full of coarse sand, and shortly thereafter its content may change. Since the "quality" of the returned mud varies constantly, it is impractical to mechanically change between conventional desilters and desanders economically.

It is therefore desirable to provide multiple function separation means for distinguishing and separating out the materials of varying density from the single fluid drilling mud medium. None of the prior art devices are equipped to satisfactorily regulate the internal pressure of the various inner chambers for proper separation, which cannot be satisfactorily achieved through centrifugal force or gravity alone. By experimentation and experience with the product, it has become evident to me that a suitable separator should provide a number of independent cleaning chambers adapted to continuously process the recovered mud in such a way as to provide an output of uniform consistency notwithstanding the fact that the incoming raw or "dirty" mud may constantly vary in quality.

SUMMARY OF THE INVENTION

The present invention comprises a system for cleaning drilling muds. The preferred machine incorporates a centrifuge desander operatively connected to a series of conical desilter units to effectuate the separation of materials of varying densities and to provide for the separation out of air and gasses for increased efficiency of the cleaning operation.

The apparatus comprises six major cooperating structures, including an initial cyclone chamber, a central separator drum, a desander cone, a plurality of cooperating desilter cones, a solid waste disposal system, and a gas release. Operationally, the cleaning process occurs in three general stages as set forth in detail in the descriptive sections which follow.

Each of the various stages of the cleaning process involves the separation of the drilling mud into medium of different densities. In the initial stage, the fluid muds containing solid materials recovered from the rotary drilling process are pumped at a controlled pressure from the cleaning bed (i.e. the recirculating mud reservoir) into the initial cyclone chamber, where, under increasing centrifugal force, the fluid muds are separated into heavier sand-bearing medium, lighter, more fluid medium and freed air and gasses.

In the second stage of the process, the medium which contains the heavier waste materials is processed within a suitable chamber within the lower level of a twin compartment, central drum. A series of baffles and vents within this chamber facilitates the operation of a subsequent desander cone where heavier impurities are removed, and from which "cleansed" mud, which is still not clean enough, is recycled back to the mud reservoir bed. Later, when this mud is recirculated through the machine, it will escape this "loop" when clean enough and eventually it will be desilted and available for the drilling operation.

Lighter products initially separated in the cyclone chamber are transmitted through the larger chamber within the lower drum compartment. This latter chamber functions as a distribution manifold, and delivers the product to a plurality of similar radially spaced apart desilting cones for further processing. The combined output of the desilter cones is delivered to the upper compartment of the drum. Interior drum baffle structure facilitates gas withdrawal and escape, and properly cleansed mud is concurrently recovered through a suitable pipe.

In the third stage, freed air and gasses are discharged at controlled rates to be burned or dispersed into the environment. Removal of the excess gas and air during critical stages of the cleaning process immediately prior to subsequent to cone handling increases the efficiency of the cones and greatly decreases mud losses in the underflow discharge. The waste materials discharged from the desander and desilter cones flow downwardly through a large funnel and are deposited into a suitable waste receiving bed.

OBJECTS OF THE INVENTION

Thus a general object of the present invention is to provide a drilling mud cleaning system which will separate out particles of varying densities from a single medium.

A fundamental object of the present invention is to provide a drilling mud cleaning system which continuously outputs a substantially uniform product, notwithstanding the fact that the quality and consistency of incoming "dirty" mud may vary constantly.

A more specific object of the present invention is to provide a three-stage drilling mud cleaning system which attains more efficient operation through the cooperative employment of centrifugal force and controlled pressure.

A similar object of the present invention is to provide a mud cleaning system which effectively avoids typically encountered problems of blockage, vacuum lock, and excessive mud loss.

A related object of the present invention is to provide a drilling mud cleaning system of the character described in which mud losses are greatly reduced.

Yet another similar object of the present invention is to provide a cleaning system which provides for separation of solids, liquids, and gasses from a single fluid mud medium.

A similar related object of the present invention is to provide an improved drilling mud cleaning system which is equipped with means for regulating input and output pressure.

Yet another object of the present invention is to provide means for recycling cleansed drilling mud through the system to reduce mud losses.

A similar object of the present invention is to provide a drilling mud cleaning system in which the input pressure may be regulated to accomodate muds of varying densities and to provide more efficient operation.

Another object of the present invention is to provide an improved apparatus for cleaning drilling muds which can be easily transported and installed on site.

These and other objects and advantages of this invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 5 is a fragmentary sectional view of the separating drum;

FIG. 6 is an enlarged scale, fragmentary sectional view of the central drum;

DETAILED DESCRIPTION

Figure 1:
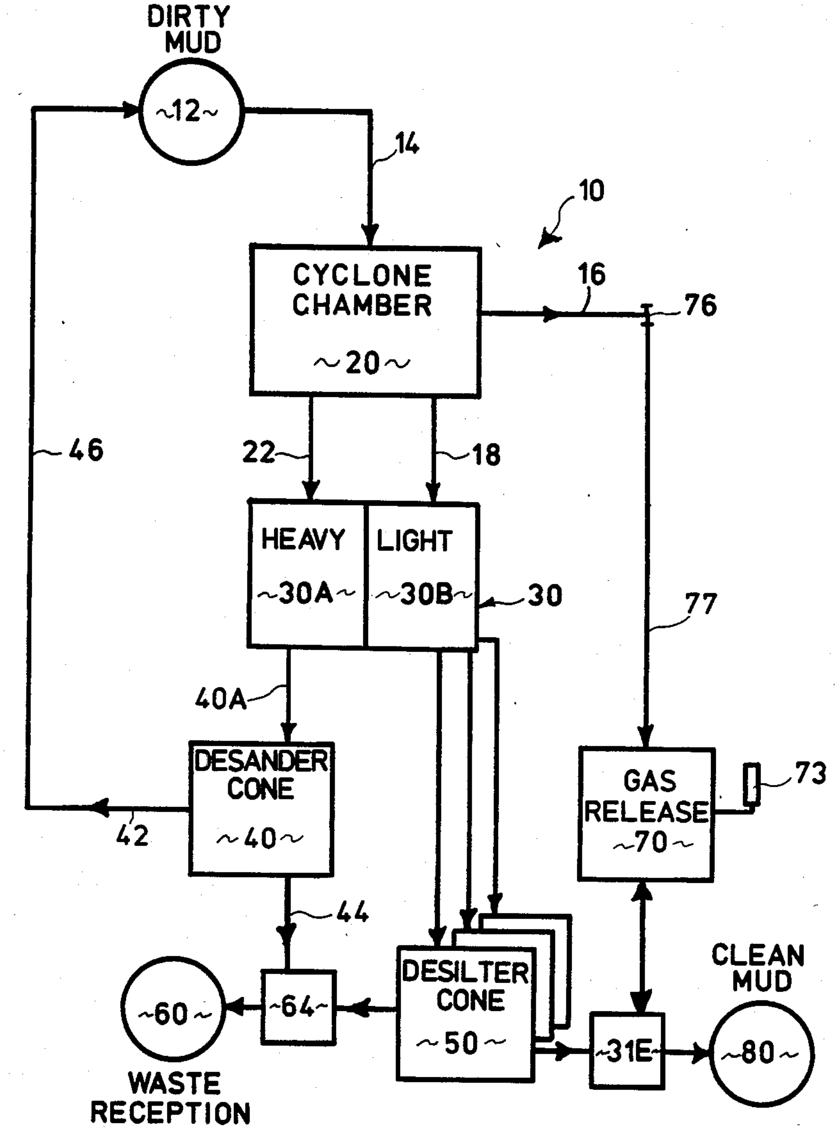
FIG. 1 is block diagram of a mud cleaning machine constructed in accordance with the best mode of the present invention, and illustrating the major stages of the mud cleaning process.

With reference now directed to the appended drawings, a drilling mud cleaning machine constructed in accordance with the teachings of the best mode of the present invention has been generally designated by the reference numeral 10. Machine 10 is adapted to be disposed at a conventional drilling site, and its function is to cleanse conventional drilling mud or fluids by concurrent desanding, desilting, gas separation and recirculating operations to recover the valuable drilling mud for subsequent reuse.

An overview of the apparatus is provided by FIG. 1. The "dirty" mud to be cleaned is transferred from a conventional cleaning bed or reservoir 12 (established at the drilling site) via conventional pipe 14 into a hollow cyclone chamber 20. The fluid mud and solid materials carried in suspension thereby are centrifugally rotated within chamber 20, and the mud is separated into relatively light and relatively heavy density constituents. Air and gasses freed in this initial separation stage pass into the gas release system 70, via pipe 16, T-connection 76, and pipe 77. However, a small quantity of particulates may nevertheless exit pipe 16.

After separation within chamber 20 the heavier medium, laden with solid wastes and the lighter, more fluid medium are carried into separate desander chamber 30A and desilter chamber 30B interiorly of the central drum 30 via pipes 22 and 18, respectively. As will hereinafter be described in detail, the heavier medium passing through the vented and baffled chamber 30A is transmitted to centrifugal desander cone 40, from which solid wastes are released through outlet 44 into a waste discharge funnel 64, leading to waste storage 60. The "recovered" but still-too-dirty mud outputted from desander cone 40 is returned to the reservoir bed 12 through pipes 42 and 46 for recycling and recleaning.

The lighter medium passes from chamber 30B into the desilter cones 50 where further cleaning and separation occurs. Heavier waste products are concurrently discharged from the desilters 50 via funnel 64 into the waste collector discharge system 60. Freed air and gasses released during this final stage are drawn out from the desilters 50 and released through the gas release system 70 via the upper level drum chamber 31E to be later described. The cleansed drilling mud is then carried into the collector bed, generally designated by the reference numeral 80.

Figure 2:
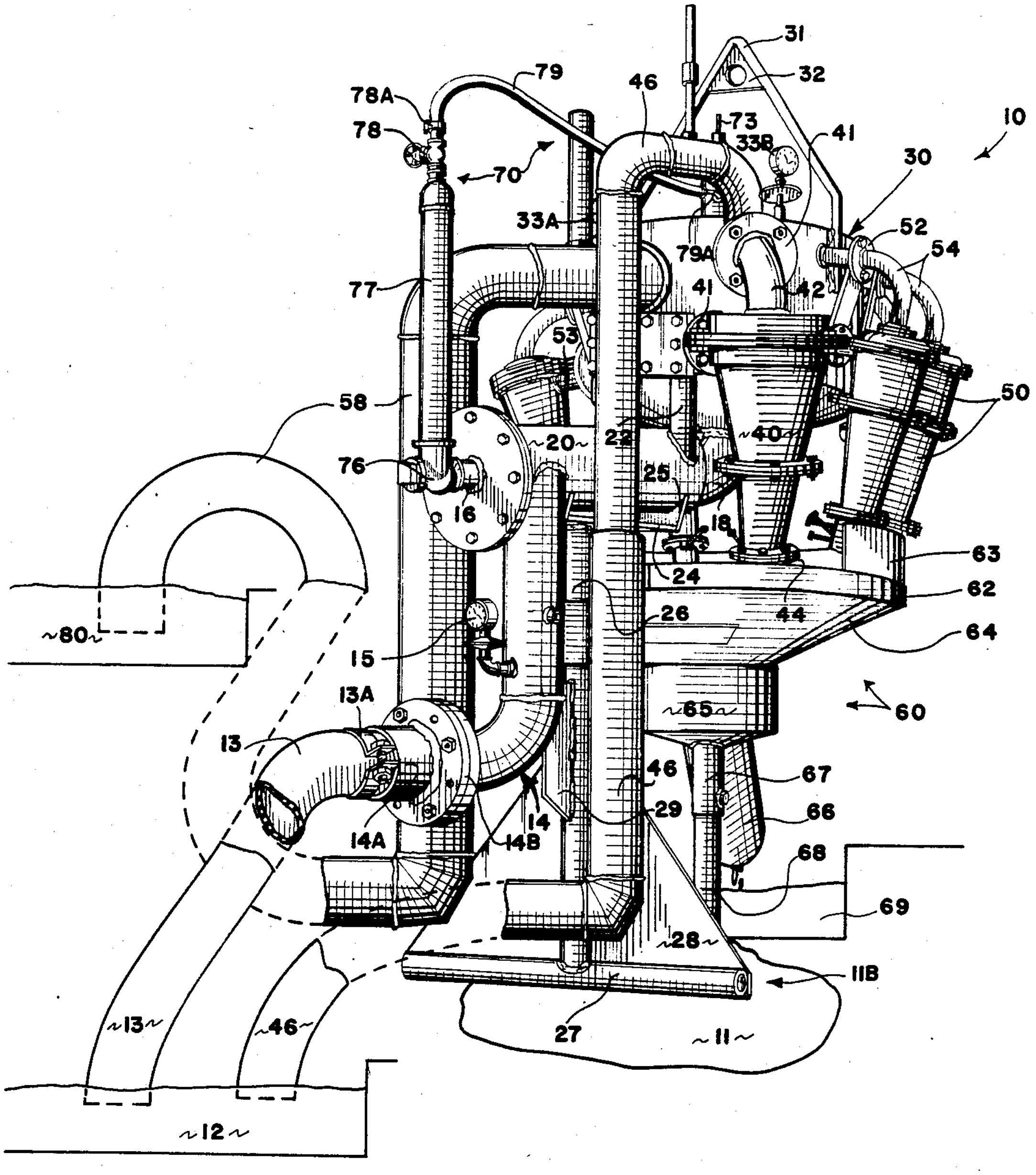
FIG. 2 is a front elevational view of the machine.
Figure 3:
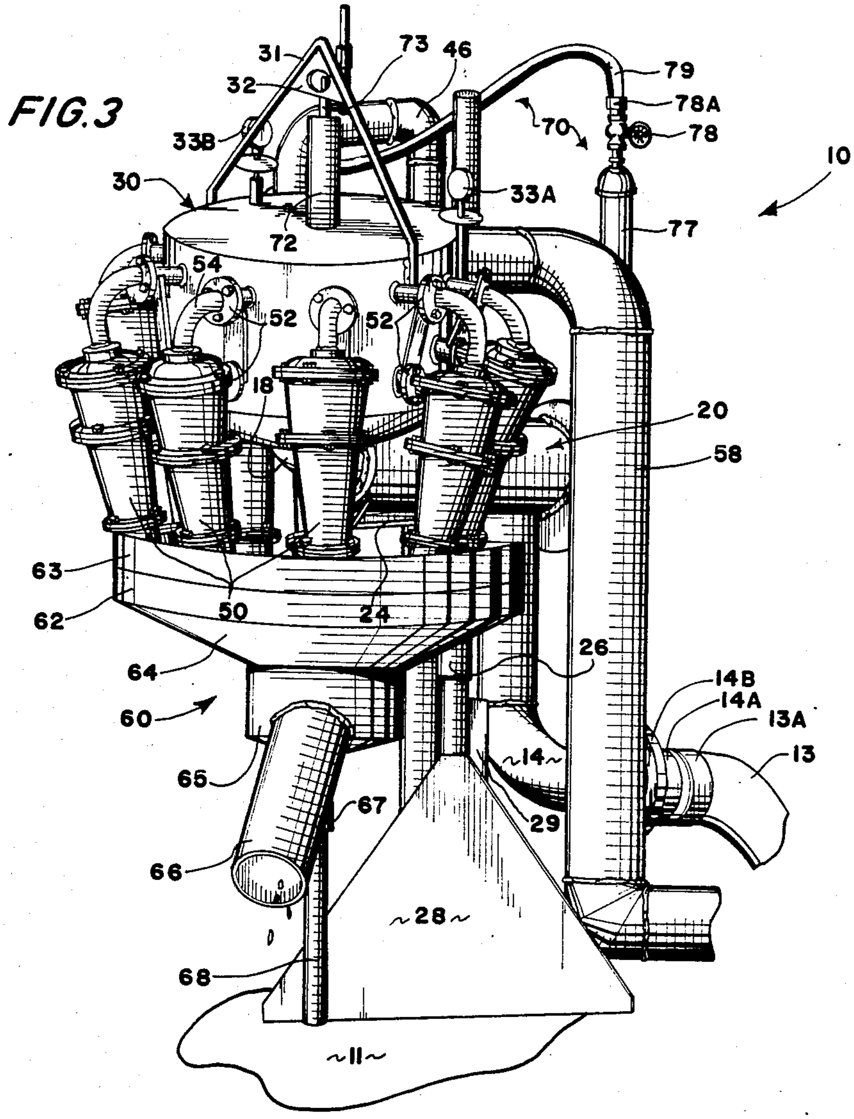
FIG. 3 is a rear elevational view of the machine.
Figure 4:
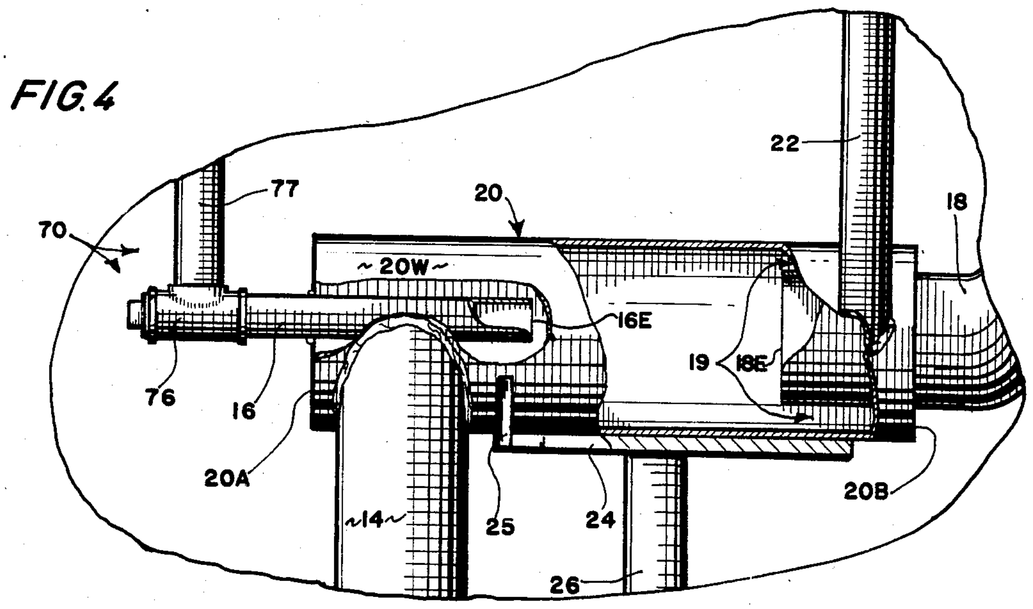
FIG. 4 is an enlarged scale, fragmentary, longitudinal sectional view of the cyclone chamber preferably employed for initial separating.
Figure 8:
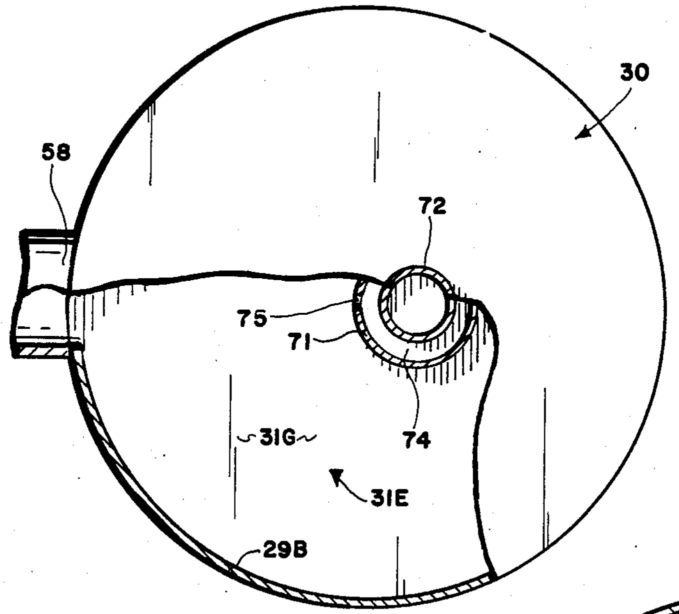
FIG. 8 is an fragmentary sectional view taken generally along line 8—8 of FIG. 6; and, FIG. 9 is an enlarged fragmentary view of interior dividing wall structure of the drum.
Figure 7:
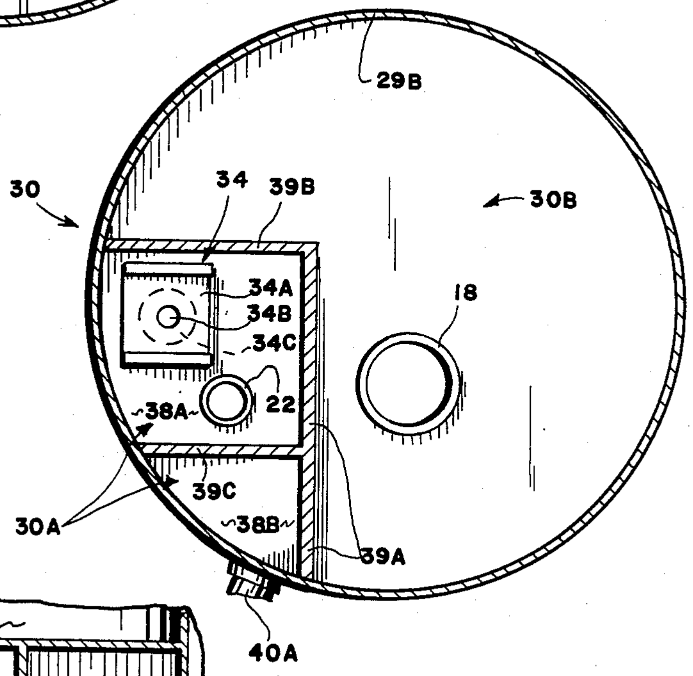
FIG. 7 is a fragmentary sectional view taken generally along line 7—7 of FIG. 6.

With additional reference now directed to FIGS. 2–5, and 9, machine 10 is adapted to be disposed upon a suitable supporting surface 11 and it includes a rigid upright frame 11B. A flexible hose 13 is secured by expansion clamp means 13A to a rigid pipe stem 14A which is suitably flanged at 14B to rigid inlet pipe 14 which extends upwardly and tangentially, and attaches exteriorly to outer wall 20W of cylindrical cyclone chamber 20 near its outer end 20A (FIG. 4). A pressure gauge 15 (FIG. 2) is provided on the outer face of the inlet pipe 14 to display inflow pressure.

With reference to FIGS. 2 and 4, the cyclone chamber 20 is horizontally disposed and supported upon a rigid, generally rectangular frame portion 24 suitably adapted with rigid flanges 25 (FIG. 4) at each end to firmly abut and cradle the cyclone chamber 20. The support frame 24 is permanently connected by welding or the like to a rigid, vertically disposed frame stanchion 26. A tubular cross bar 27 (FIG. 2) is permanently connected by welding or the like in generally perpendicular relation to the lower end of the vertical stanchion 26. Rigid webbing 28 is welded to stanchion 26 and cross bar 27 for increased stability of the apparatus. Inlet pipe 14 is supported in a stable position generally parallel to stanchion 26 upon a planar flange 29 of generally rectangular dimensions.

Outer tubular casing 20W (FIG. 4) receives a gas outlet pipe 16, which generally coaxially penetrates its end 20A. The end 16E of pipe 16 is spaced apart from the end 18E of pipe 18, which coaxially penetrates chamber 20 at its opposite end 20B. The tangentially intersecting pipe 22 communicates with the annular void 19 defined between pipe 18 and the casing 20W. In response to the inrush of dirty mud via pipe 14, interiorly rotating "heavy" materials will be centrifugally forced into annular void 19 and out through pipe 22, while "lighter" materials will be drawn out through pipe 18. Materials outputted through pipes 18 and 22 must be further processed however.

A large, generally cylindrical material processing drum, broadly designated by the reference numeral 30, is elevated in the center of the apparatus and supported upon the desilter inlet channel 18 which extends coaxially, rearwardly out of the initial cyclone chamber 20 (FIGS. 2, 4). Further support is provided for the central drum by the rigid desander pipe 22 (FIGS. 4, 5) which extends vertically out of the cyclone chamber 20 through the lower floor 30F of drum 30. The rigid, angular mount 31 (FIGS. 2 and 3) includes a rigid, generally triangular, preferably steel plate 32 which is suitably bored to receive a crane hook or the like, is permanently connected to the outer sides of the central drum 30 by means of welding or the like to permit convenient transport and placement of the apparatus 10 at the selected drilling site.

Figure 9:
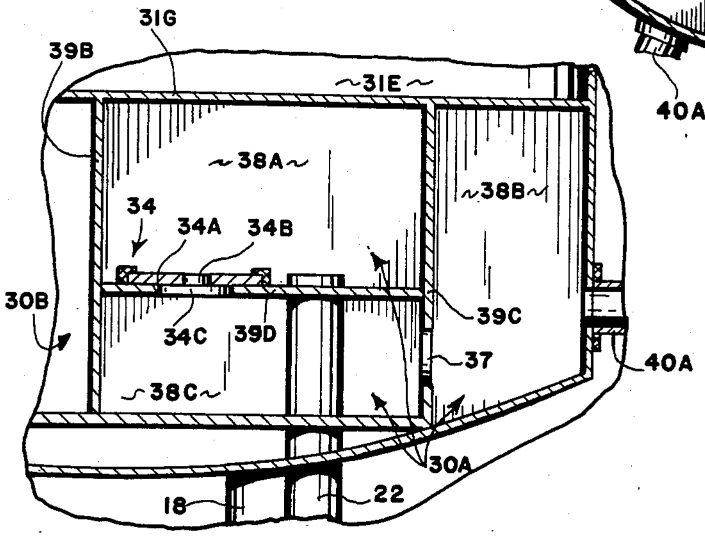

As best illustrated in FIGS. 5-9, the generally hollow interior of the drum 30 comprises an upper level desilting chamber 31E and a lower level 31X which are separated from one another by a rigid interior floor 31G. Chamber 31E is a collection chamber for desilted mud, and the desilting cones discharge into it. lhe lower level 31K is divided into a desilter feeding chamber 30B and an adjoining desander feeding chamber 30A (FIGS. 6,7) which is divided from chamber 30B by steel compartment walls 39A and 39B. Chamber 30A is further interiorly divided into pressure reduction compartments 38A, 38B and 38C (FIG. 9) by rigid interior wall 39C and floor 39D. With reference to FIGS. 5 and 9, pipe 22 exhausts to compartment 38A (which operates at roughly 50 PSI), which is in fluid flow communication with adjacent compartment 38C via valve structure 34 provided in dividing floor 39D. This valve structure includes a replaceable plate 34A (FIG. 9) having an orifice 34B of a selected size to pass materials through adjoining hole 34C in wall 39D to communicate with chambers 38C and 38B (via orifice 37). Pressure in compartment 38B is nominally 30 PSI. Adjacent compartment 38B is similarly in fluid flow communication with compartment 38C via orifice 37 defined in partition wall 39C.

Internal pressure of the lower desander entry compartment 38B is measured by pressure gauge 33A which penetrates the wall of the desander inflow chamber. A conventional pressure gauge 33B measures pressure within the upper chamber 31E (FIG. 6) of the central drum 30, which is in the form of a large, generally annular chamber defined between the radial drum periphery 29B and the offset, central pipe 71 (FIG. 8), as will hereinafter be explained.

Suspended about the outer circumference of the central drum 30 are a large, conical desander cone 40 and a multiplicity of smaller, conical desilter cones generally designated herein by the reference numeral 50. An input to the desander cone 40 is operatively established from the central drum 30 by a pair of feed pipe 40A (FIG. 5) which extends horizontally outwardly from the outer wall 30W of the central drum 30 and are joined by conventional flanges 41 (FIG. 1) to inflow pipe 42A and further to the desander discharge pipe 42 and desander cone 40. Thus the output of chamber 30A (and compartment 38B thereof) is delivered into the desander cone 40. Although pipes 42, 46 are mechanically braced by the drum by physical attachment to the periphery thereof, the output of cone 40 is isolated from upper barrel chamber 31E. The desander apparatus 50 is described in detail in U.S. Pat. No. 4,431,535 which is hereby incorporated by reference. It essentially comprises a tri-sectional, outer coneshaped housing encasing an inner rotational centrifuge chamber.

The desilter cones, each of which is generally referenced herein by the numeral 50, comprise similar operative structure and function in a manner similar to that of the desander apparatus. As best viewed in FIG. 6, the desilter cones 50 are connected to the central drum by feed pipes 50A and 50B which are joined by conventional headers 52 to the desilter inflow 53 and discharge pipes 54 (FIG. 1). Conventional output orifice closure valves are preferably provided to regulate waste discharge from the desilters. Stability and support of the cones is provided by the structure of the underlying waste discharge apparatus generally designated herein by the reference numeral 60 (FIGS. 2 and 3).

The waste discharge structure 60 comprises a generally conical receiving pan having a rigid, vertical lip 62 about its circumference which firmly abuts the outer wall of the waste discharge outlet 44 of the desander cone 40. A rigid, vertical support wall 63 which extends from the lip 62 around approximately two-thirds of the circumference of the structure helps mount the radially spaced apart desilter cones 50. A downwardly sloping basin 64, a tubular outflow funnel 65 and a discharge spout 66 direct wastes collected from the upper outputs (i.e. the "heavy material" bottom outlet pipes of each of the conical desilters and the desander) and directs wastes to a remote storage site 69. The outflow funnel 65 terminates at its lower end in a rigid, tubular mount 67 which is adapted to be slidably mounted upon the rigid support pole 68 which supports the entire waste discharge structure 60 in a central position beneath the central drum 30 (FIGS. 2 and 3). The waste materials deposited into the system flow downwardly from the basin 64 through the funnel 65 and are guided by the discharge spout 66 into a suitable waste receiving bed 69.

The gas release system, generally designated herein by the reference numeral 70, includes a tubular chimney 72 (FIGS. 5, 6) which extends upwardly through the upper level chamber 31E of the central drum 30 and terminates at its upper end in a smaller diameter bisectional jet 73. Chimney 72 concentrically penetrates a surrounding pipe segment 71 (FIG. 6) and an annular void 74 is defined therebetween. The base of chimney 72 is spaced apart from the drum divider floor 31G. A gas inlet port 75 is preferably defined in one wall of the pipe segment 71.

The gas release system 70 is connected to the gas release pipe 16 (FIG. 4) feeding from the cyclone chamber 20 by a conventional elbow joint 76. Extending upwardly from the elbow 76 is the tubular compression canister 77 (FIG. 6) which terminates at its upper end in a conventional compression control valve 78 (FIG. 6). A conventional clamp 78A securely connects compression control valve 78 to a flexible hose 79 which terminates in a small, rigid, jet stem 79A connected to hose 79 by a conventional clamp 79B. Jet stem 79A penetrates the wall of chimney 72 and thus provides a pathway for controlled release of the air and gasses freed during the initial stage of the cleaning process. Gases swirling within pipe 72 will be released into the atmosphere through pipe 73, but mud particles will spiral downwardly within pipe 72 into volume 74. A fluid lock is created within chamber 31E and volume 74 by the volume of mud accumulating within chamber 31E and extending upwardly generally level with the top of pipe 71. With the fluid lock gas which enters pipe 72 cannot be pulled into chamber 31E.

Operationally, the cleaning process occurs in three general stages. Fluid mud containing solid materials entrained during the rotary drilling process are drawn by conventional pumps upwardly through the tubular inlet 14 into the outer end 20A of the initial cyclone chamber 20. As the mud enters the initial cyclone chamber 20 under controlled pressure, it is set in rotating motion. As centrifugal force increases within the chamber, the heaviest solid particles are slung outwardly and the lighter fluid medium and the freed air and gasses are forced to the center of the rotating mass. The rotation of the mud mass under pressure permits the creation of a relatively reduced pressure, low turbulence area in the adjacent gas release pipe 16 which coaxially penetrates the outer end 20A of the cyclone chamber 20, so that the freed air and gasses are drawn out of the center away from the rotating mud mass. The removal of freed air and gasses through the gas release system 70 greatly enhances the efficiency of the apparatus and aids to reduce substantially usable mud losses.

As mud continues to feed into the initial separator 20, the mass of solid medium is forced toward the opposite, inner end 20B which is coaxially penetrated by the rigid, tubular desilter inlet channel 18. The lighter fluid medium generally comprises the greater proportion of the mud suspension, and it is forced out of chamber 20 into channel 18, and delivered to desilter chamber 30B, which feeds the desilting cones. The heavier medium remains trapped within annular void 19 and is pushed upwardly under centrifugal force and pressure into the smaller diameter desander pipe 22. And, as previously described, gas escapes through pipe 16. Thus the initial stage of the medium separation process is completed, the materials of three varying densities separated and routed into different parts of the system.

The heavier (and still "dirty") separated medium from the cyclone chamber 20 is received by chamber 30A through the desander pipe 22. Chamber compartment 38A receives the medium first, and this heavier medium is forced through the small jet orifice 34B (FIGS. 7, 9) defined through the dividing wall 39D which separates compartment 38A from the secondary compartment 38C. Hole 37 in dividing wall 39C communicates with the desander feed section 38B. Forcing the medium to pass through these jet orifices 34B and 37 effectively reduces and regulates the pressure (i.e. within chamber 38B) at which the medium finally enters the desander cone 40 via desander inlet feed pipe 40A. Plate 34 is replaceable, and by varying the size of orifice 34B the resultant pressure differential may be varied.

The lighter, fluid material remaining from this heavier medium is drawn by vacuum pressure upwardly through the exit feed pipe 40B at the upper end of the desander cone 40 and forced through the sectional mud recovery return 46. The "cleaner" mud flows back through the mud recovery return 46 to the cleaning bed 12 to be recycled through the initial separation stage discussed in detail in the preceeding paragraphs. The solid waste materials are then released through the lower discharge orifice 44 (FIG. 1) of the desander cone 40. The solid waste materials are discharged from the desander cone 40 into the waste discharge structure 60 to complete the second stage of the mud cleaning process.

With reference again directed to FIG. 6, the third stage of the drilling mud separation and cleaning process is generally accomplished within the desilter cones 50. The lighter medium separated out during the initial stage of the process is carried under pressure from the initial cyclone chamber 20 through the pipe 18 into the desilter inflow chamber 30B in the central drum 30. This lighter medium is set in motion within the open desilter inflow chamber 30B and is thence forced through any of the multiplicity of desilter inlet feed pipes 50A which penetrate the wall of the chamber 30B and are connected to the desilter cones 50 by suitable headers 52 and pipes 53 (FIGS. 3, 6).

The rate of inflow and chamber pressure are effectively controlled by thus forcing the liquid medium to pass through the narrow inlet feed pipes 50A. The operation of the desilter cones 50 is generally similar to that of the desander cone 40 as described above, in that centrifugal force effects the further separation of the drilling mud from heavier waste particles which are released through the conventional discharge orifices (not shown) at the lower end of the cones 50 into the waste discharge system 60. The solid wastes thus discharged from the desander cone 40 and desilter cones 50 are deposited into the waste discharge basin 64, flow downwardly through the funnel 65, and are guided by the discharge spout 66 into a suitable waste receiving bed 69.

The cleansed drilling mud accumulating within level 31E flows through the tubular outflow 58 and flows downwardly into a suitable collector bed 80 (FIG. 1) to be used again in the rotary drilling process. Pipes 71 and 74 cooperate to provide a fluid lock to eliminate the gas from pipe 72 from being pulled back into chamber 31E to mix with and agitate the accumulating mud level within region 31E. When handling aerated mud, valve 78 is to be left open so that gas can be removed and vented out pipe 73, but at the same time the aforedescribed fluid lock will prevent entrance of gas while facilitating recapture of mud particles spiraling down pipe 72 through volume 74.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A multiple-function cleaning, desilting and desanding machine for cleaning drilling muds which contain unwanted solid waste materials entrained during drilling processes, the machine comprising:

supportive frame means adapted to be disposed upon a supportive surface for securely positioning said machine at a selected drilling site;

a cyclone chamber having means for receiving dirty drilling mud from a cleaning bed and separating said dirty drilling mud into a first component of relatively heavy density, a second component of relatively light density, and a third gaseous component;

drum means for further purifying mud, said drum means comprising an upper level for collecting cleansed mud and including means for discharging said cleansed mud, a lower level having means for receiving and processing said first and second components outputted from said cyclone chamber, said lower level comprising:

a first chamber having means for receiving said first component, distributing it into a suitable output pipe and having means regulating the pressure thereof; and, a second chamber having means for receiving said second component and distributing it to a plurality of output ports;

desander means in fluid flow communication with said output pipe of said first chamber for separating waste products from said first component of relatively heavy density to obtain cleaner mud, said desander means having means for returning cleaner mud into said cleaning bed and having a means for outputting waste mud;

desilter means fluidly connected to said output ports for separating waste products from said second component to obtain clean mud, said desilter means being fluidly connected to said upper level and having an outlet means for waste mud; and discharge means fluidly connected to said means for outputting of said outlet means, for channeling solid waste products into a suitable waste receiving bed.

2. The mud cleaning machine as defined in claim 1 in which said first chamber for receiving said first component comprises a plurality of interdependent, associated internal compartments separated by rigid divider walls, said means for regulating being defined by suitable orifice means on one of said walls through which said mud passes via said output pipe into said desander means.

3. The mud cleaning machine as defined in claim 2 wherein said first chamber compartment comprises:

a first generally cubicle compartment including said means for receiving said first component from said cyclone chamber;

a second generally cubicle compartment adjacent to and parallel with said first compartment;

means including a valve for establishing fluid flow communication between said first and second compartment;

a third compartment, fluidly connected to said second compartment, adjacent to said first and second compartments and oriented generally transversely with respect thereto, said third compartment outputting to said desander means via said output pipe.

4. The mud cleaning machine as defined in claim 3 wherein:

said upper level being a generally circular chamber; and, said upper level chamber includes a pair of generally concentric pipes disposed within said upper level chamber for forming a fluid lock.

* * * * *